(12) United States Patent
Helms

(10) Patent No.: US 10,794,576 B1
(45) Date of Patent: Oct. 6, 2020

(54) SLIDE ADJUSTABLE HINGE AND LATCH SECUREMENT FOR A LIGHT EMITTING DIODE (LED) FIXTURE RETROFIT KIT

(71) Applicant: UNIVERSAL LIGHTING TECHNOLOGIES, INC., Madison, AL (US)

(72) Inventor: John Helms, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/529,960

(22) Filed: Aug. 2, 2019

Related U.S. Application Data

(60) Provisional application No. 62/713,582, filed on Aug. 2, 2018.

(51) Int. Cl.
  F21V 21/03 (2006.01)
  F21S 8/04 (2006.01)
  F16M 13/02 (2006.01)
  F21Y 115/10 (2016.01)
  F16C 11/10 (2006.01)

(52) U.S. Cl.
  CPC .............. F21V 21/03 (2013.01); F16C 11/10 (2013.01); F16M 13/022 (2013.01); F21S 8/043 (2013.01); F16M 2200/027 (2013.01); F21Y 2115/10 (2016.08)

(58) Field of Classification Search
  CPC ....... F21V 21/03; F16C 11/10; F16M 13/022; F16M 2200/027; F21S 8/043; F21Y 2115/10
  See application file for complete search history.

(56) References Cited

U.S. PATENT DOCUMENTS

| | | | | |
|---|---|---|---|---|
| 2,721,635 A * | 10/1955 | Fullerton | ................ | F21V 17/00 49/254 |
| 3,788,689 A * | 1/1974 | Lloyd | ................... | E05C 19/006 292/304 |
| 7,387,410 B2 * | 6/2008 | Sibout | ................... | F21V 7/0016 362/375 |
| 8,038,318 B2 * | 10/2011 | Plunk | ....................... | F21S 8/02 362/217.11 |
| 8,083,369 B1 * | 12/2011 | Richardson | ............. | F21S 8/026 362/217.11 |
| 8,872,077 B2 * | 10/2014 | Gagas | .................. | H05B 6/1209 219/620 |
| 8,888,313 B2 * | 11/2014 | Green | ....................... | F21V 3/06 362/218 |
| 9,206,948 B1 * | 12/2015 | Scribante | ................ | F21K 9/275 |
| D765,905 S * | 9/2016 | Oldani | ......................... | D26/113 |

(Continued)

*Primary Examiner* — Tsion Tumebo
(74) *Attorney, Agent, or Firm* — Patterson Intellectual Property Law, P.C.; Gary L. Montle; Grant M. Ford

(57) ABSTRACT

A hinge apparatus and method of use are provided for securing to a slide of a retrofit kit and to an opening of a fixture. The hinge apparatus includes a hinge configured to couple to the opening of the fixture, a top section coupled to the hinge, a lower section coupled to the top section and having a cavity formed therebetween, the cavity configured to be coupleable to the retrofit kit, a hinge brake securement device coupled to the top section, a neck extending outwardly from the hinge brake securement device, a hinge brake coupled to the neck, and a notch coupled to the hinge brake, the notch configured to be receivable at the slide of the retrofit kit.

18 Claims, 5 Drawing Sheets

(56) References Cited

U.S. PATENT DOCUMENTS

| | | | | |
|---|---|---|---|---|
| 10,302,262 B2* | 5/2019 | Huang | ................... | F21V 3/02 |
| 2011/0001060 A1* | 1/2011 | Welker | ................ | F24F 13/078 |
| | | | | 250/455.11 |
| 2012/0300471 A1* | 11/2012 | Howe | ................... | F21V 5/005 |
| | | | | 362/328 |
| 2013/0235568 A1* | 9/2013 | Green | ................... | F21V 3/06 |
| | | | | 362/218 |
| 2014/0071699 A1* | 3/2014 | Plomteux | ............ | F21K 99/00 |
| | | | | 362/373 |
| 2015/0062913 A1* | 3/2015 | Howe | ................... | F21V 5/002 |
| | | | | 362/294 |
| 2017/0356632 A1* | 12/2017 | Rao | ...................... | E04B 9/003 |
| 2018/0003367 A1* | 1/2018 | Halliwell | ................ | F21S 8/04 |
| 2019/0257481 A1* | 8/2019 | Patel | ................... | F21V 17/107 |

* cited by examiner

SLIDE ADJUSTABLE HINGE AND LATCH SECUREMENT FOR A LIGHT EMITTING DIODE (LED) FIXTURE RETROFIT KIT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/713,582, filed Aug. 2, 2018 and titled "SLIDE ADJUSTABLE HINGE AND LATCH SECUREMENT FOR LED TROFFER RETROFIT KIT," which is hereby incorporated by reference in its entirety.

BACKGROUND

The present disclosure relates generally to a hinge apparatus, retrofit kit, and a method of retrofitting a fixture with a light emitting diode (LED) light source. Currently, most LED retrofit kits require the use of tethers or brackets to hang an LED troffer retrofit kit panel while making the wiring connections to the luminaire or to directly secure an LED module and driver components to the troffer housing via sheet metal or self-tapping screws. What is needed, then, is to develop a hinge assembly to be integral to or mounted onto a LED retrofit kit intended for installation into existing luminaires.

BRIEF SUMMARY

An adjustable hinge assembly consistent with the present disclosure may allow a light emitting diode (LED) troffer retrofit kit panel to hang from existing openings of a fixture and may eliminate the need and cost for extra mounting hardware while also reducing installation time. In addition, the hinge assembly may be adjustable and may allow hinges to be moved to align with hinge openings of a fixture since different fixture or troffer models may position these openings or slots differently. Hinge assemblies may be adjusted to position a hinge and lock it into place so that it will align with the existing hinge slots or openings in a troffer luminaire housing.

One embodiment of the present disclosure provides a hinge apparatus for securing to a slide of a retrofit kit and to a hinge opening of a fixture. The apparatus includes a hinge configured to couple to the opening of the fixture, a top section coupled to the hinge, a lower section coupled to the top section and having a cavity formed therebetween, the cavity configured to be coupleable to the retrofit kit, a hinge brake securement device coupled to the top section, a neck extending outwardly from the hinge brake securement device, a hinge brake coupled to the neck, and a notch coupled to the hinge brake, the notch configured to be receivable at the slide of the retrofit kit.

The hinge apparatus may include an extension coupled between the top section and the hinge. The hinge brake securement device may be rotatably coupled to the top section. The hinge brake may rotate about the hinge brake securement device. The hinge brake may restrict movement of the hinge apparatus along the slide of the retrofit kit when the notch is received within the slide of the retrofit kit. The hinge apparatus may move along the slide of the retrofit kit when the notch is not received within the slide of the retrofit kit. The cavity may receive at least a portion of the retrofit kit therein.

Another embodiment of the present disclosure provides a retrofit kit for retrofitting a fixture with an LED light source. The retrofit kit includes a body having a slide, at least a portion of the slide including a groove, and a hinge apparatus. The hinge apparatus includes a hinge coupleable to the fixture, a top section coupled to the hinge, a lower section coupled to the top section and having a cavity formed therebetween, the cavity configured to receive at least a portion of the slide, a hinge brake securement device coupled to the top section, a neck extending outwardly from the hinge brake securement device, a hinge brake coupled to the neck, and a notch coupled to the hinge brake, the notch configured to be receivable by the groove. An LED light source is coupleable to at least one of the body or the fixture.

The hinge brake securement device may be rotatably coupled to the top section. The hinge brake may rotate about the hinge brake securement device. The hinge brake may restrict movement of the hinge apparatus along the groove when the notch is received within the groove. The hinge apparatus may move along the groove of the retrofit kit when the notch is not within the groove. The cavity may receive at least a portion of the slide therein.

A further embodiment of the present disclosure provides a method of retrofitting a fixture with an LED light source using a retrofit kit. The method begins by removing a lens cover from the fixture. A position of at least one hinge assembly of the retrofit kit is adjusted to correspond to at least one hinge opening location of the fixture. The at least one hinge assembly is coupled to the at least one hinge opening location. An existing light source is removed from the fixture and replaced with the LED light source. A position of at least one latch of the retrofit kit is adjusted to correspond to at least one latch opening location of the fixture. The at least one latch is coupled to the at least one latch opening location.

The adjusting the position of the at least one hinge assembly to correspond to the at least one hinge opening location may include translating the at least one hinge assembly along a slide of the retrofit kit while a notch of the hinge assembly is external to a groove of the slide. The coupling the at least one hinge assembly to the at least one hinge opening location may include locking a position of the hinge assembly relative to a slide of the retrofit kit by moving a hinge brake of the hinge assembly into a locking position. The moving the hinge brake into the locking position may include rotating the hinge brake to cause a notch of the hinge brake to be received within a groove of the slide. Prior to adjusting the position of the at least one hinge assembly, the method may include moving a hinge brake of the hinge assembly into an unlocked position. Moving the hinge brake into the unlocked position may include rotating the hinge brake to cause a notch of the hinge assembly to exit a groove of the retrofit kit. The at least one hinge assembly may include a plurality of hinge assemblies, and adjusting the position of at least one hinge assembly to correspond to the at least one hinge opening location of the fixture may include adjusting at least one of the plurality of hinge assemblies.

Numerous other objects, features, and advantages of the present invention will be readily apparent to those skilled in

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
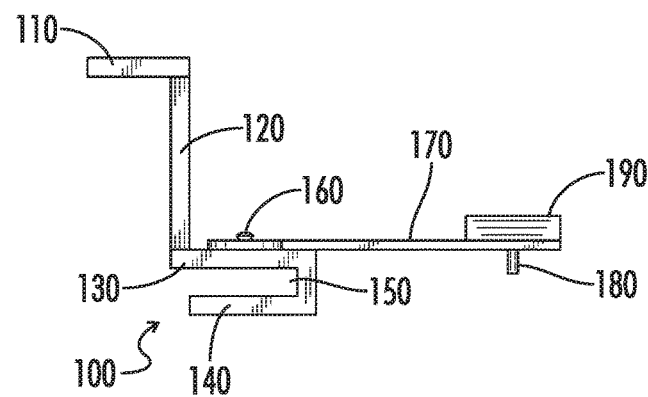
FIG. 1 illustrates a left side view of an exemplary embodiment of a hinge assembly according to aspects of the present disclosure.

Referring generally to FIGS. 1-7, a hinge assembly and retrofit adapter kit are provided. As used herein, the terms troffer and fixture are used synonymously. FIG. 1 illustrates a left side view of an exemplary embodiment of a hinge assembly 100 according to aspects of the present disclosure. A hinge assembly 100 may include one or more of a hinge 110, an extension 120, a top section 130, a lower section 140, a cavity 150, a hinge brake securement device 160, a neck 170, a notch 180, and/or a hinge brake 190. One or more elements of the hinge assembly 100 may be, either in whole or in part, metal, plastic, ceramic, fiber-based composites, and other materials, or combinations of these or other materials suitable of use as described herein.

The hinge 110 of the hinge assembly 100 may be designed to fit within an opening of or otherwise be coupleable to a troffer or hinge opening thereof. Although illustrated as having a fixed shape and size in the figures it should be appreciated that the hinge 110 and/or other element of the hinge assembly 100 may have different shapes and/or sizes in various embodiments, for example based at least in part upon one or more application parameters and/or troffer or hinge opening thereof. The hinge 110 is connected to the top section 130 via the extension 120. A length of the extension 120 may be selected or predetermined based at least in part upon a size or configuration of a hinge assembly 100, troffer, or hinge opening of a troffer. In various embodiments, the extension 120 may be expandable or contractable to permit adaptation in the field. The top section 130 is connected to a lower section 140. In the illustrated embodiment, the top section 130 opposes the lower section 140 and forms a cavity 150 therebetween. Although described as a top and lower section, it should be appreciated that the terms top and lower are used only with reference to one another and no limitation of spatial configuration of either should be inferred. For example, in one or more embodiments, the top section 130 may be located at a lower position than the lower section 140, or vice-versa.

The hinge brake securement device 160 is coupled to the top section 130. The neck 170 extends outwardly from the hinge brake securement device 160. The hinge brake securement device 160 may be pivotally coupled to the top section 130 and configured to rotate in a clockwise or counterclockwise direction around a central pivot of the hinge brake securement device 160. The hinge brake securement device 160 may be a rivet or other mechanical fastener in various exemplary embodiments. At least one of a notch 180 and/or hinge brake 190 may be located at an opposite end of the neck 170 from the hinge brake securement device 160.

Figure 2:
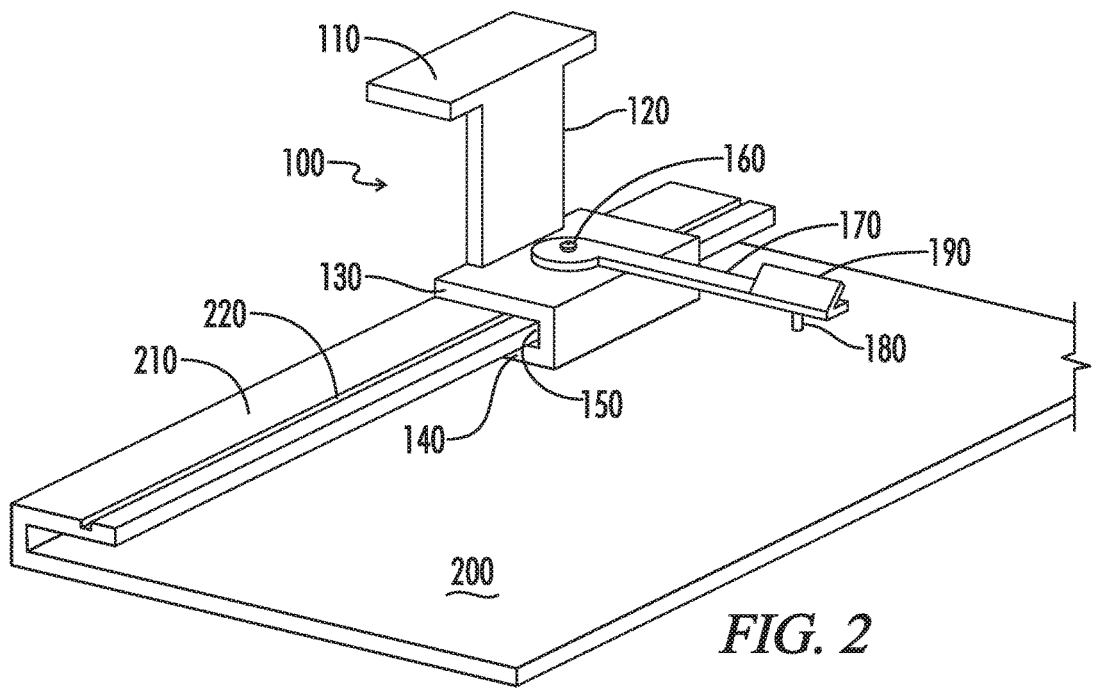
FIG. 2 illustrates a raised perspective view of an exemplary embodiment of a hinge assembly coupled to a retrofit kit in an unlocked configuration according to aspects of the present disclosure.

FIG. 2 illustrates a raised perspective view of an exemplary embodiment of a hinge assembly 100 coupled to a retrofit kit 200 in an unlocked configuration according to aspects of the present disclosure. The retrofit kit 200 may include one or more of a slide 210 and/or groove 220. The retrofit kit 200 may be configured with one or more components to retrofit an existing lighting fixture. For example, the retrofit kit 200 may be an LED retrofit kit designed with one or more components to convert an existing fluorescent or other lighting type fixture to an LED lighting fixture. Although illustrated as having a single hinge assembly 100, in various embodiments the retrofit kit 200 may include two or more hinge assemblies 100 and/or may permit a user to couple one or more hinge assemblies 100 to the retrofit kit 200 to adapt to a troffer or hinge opening configuration. Additionally or alternatively, one or more hinge assemblies 100 may be placed at one or more predetermined locations on the slide 210 and optionally placed in a locked configuration to correspond to a known or predicted troffer or hinge opening configuration.

The slide 210 of the retrofit kit 200 may be integral to or otherwise coupleable to the retrofit kit 200. The hinge assembly 100 may be configured to receive at least a portion of the slide 210, for example at the cavity 150 thereof. The notch 180 may be configured to correspond to a size and/or shape of the groove 220. In the embodiment illustrated by FIG. 2, the hinge assembly 100 is in an unlocked state, as the hinge brake securement device 160 is in a rotated position whereby the notch 180 is not received by the groove 220. When in the unlocked state, the hinge assembly 100 may be configured to move along the slide 210, for example to place the hinge 110 in alignment with a hinge opening of a troffer.

Figure 3:
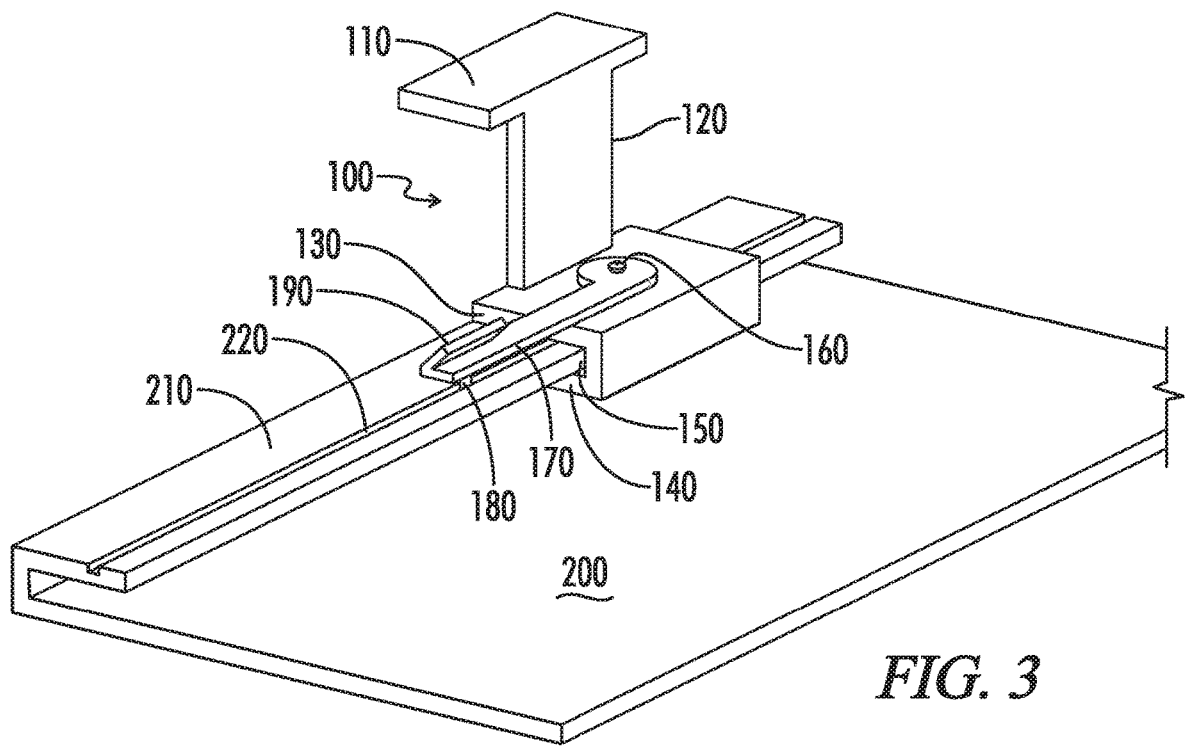
FIG. 3 illustrates a raised perspective view of an exemplary embodiment of a hinge assembly coupled to a retrofit kit in a locked configuration according to aspects of the present disclosure.

FIG. 3 illustrates a raised perspective view of an exemplary embodiment of a hinge assembly 100 coupled to a retrofit kit 200 in a locked configuration according to aspects of the present disclosure. In the embodiment illustrated by FIG. 3, the hinge brake securement device 160 is in a rotated position whereby the notch 180 is received by the groove 220. The hinge assembly 100 may optionally be placed in the locked position by a user after moving the hinge assembly 100 along the slide 210 of the retrofit kit 200. By doing so, the hinge assembly 100 may be placed at a location whereby the hinge 110 aligns with a hinge opening of a troffer.

Figure 4:
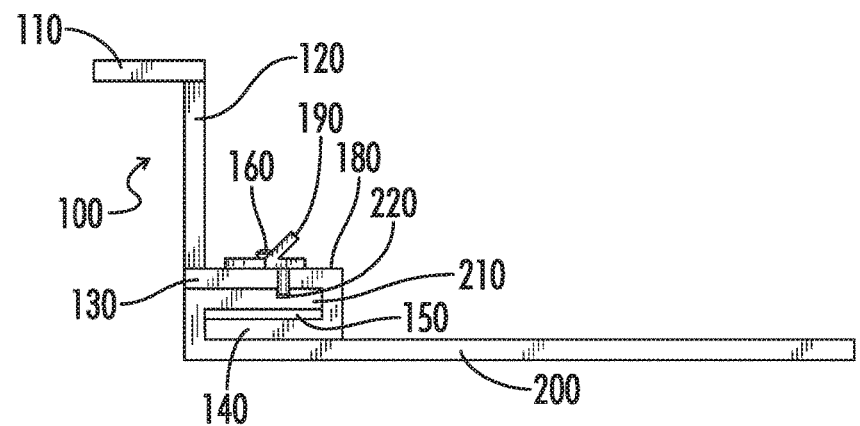
FIG. 4 illustrates a left side view of an exemplary embodiment of a hinge assembly coupled to a retrofit kit in a locked configuration according to aspects of the present disclosure.

FIG. 4 illustrates a left side view of an exemplary embodiment of a hinge assembly 100 coupled to a retrofit kit 200 in a locked configuration according to aspects of the present disclosure. At least a portion of the retrofit kit 200 may be received within the cavity 150 of the hinge assembly 100. The notch 180 may be configured to extend at least partially into the groove 220.

Figure 5:
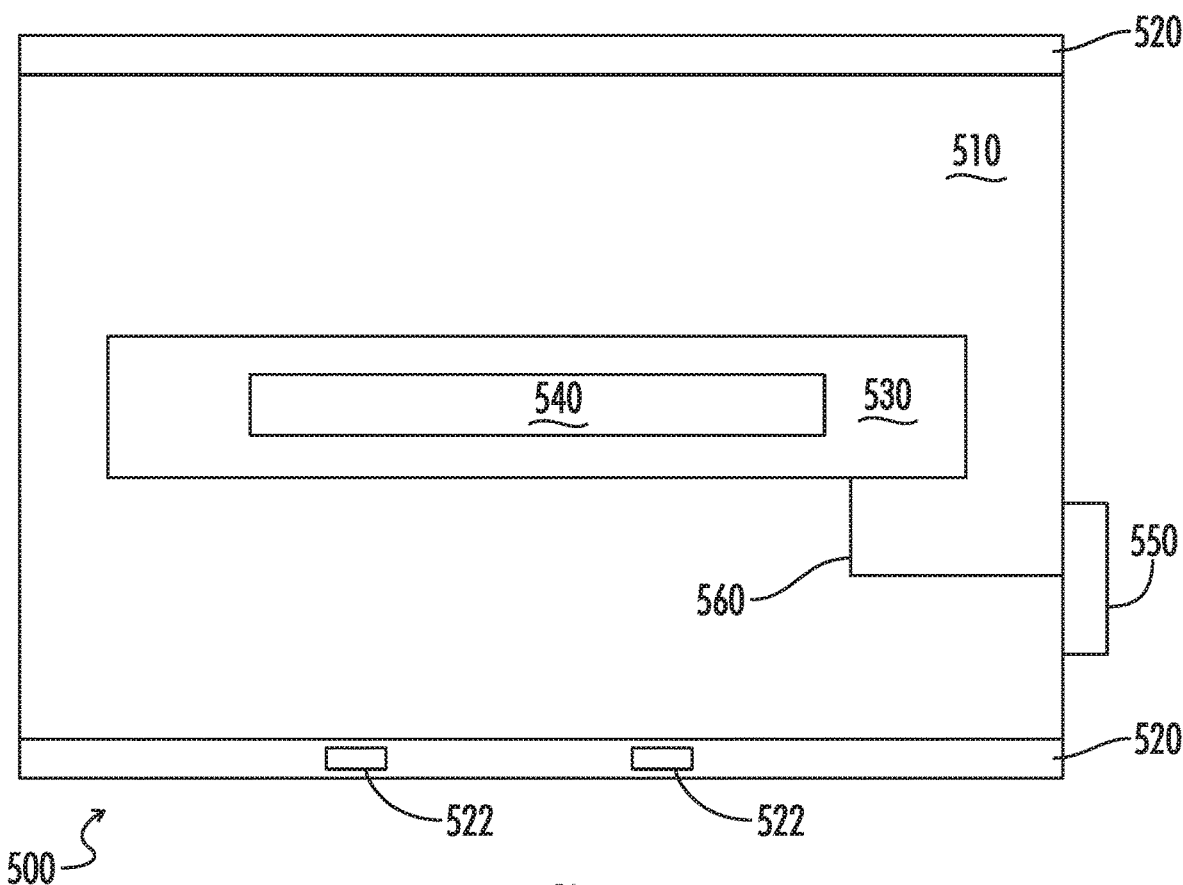
FIG. 5 illustrates an exemplary embodiment of a fixture capable or retrofitting via a retrofit kit according to aspects of the present disclosure.

FIG. 5 illustrates an exemplary embodiment of a fixture capable or retrofitting via a retrofit kit according to aspects of the present disclosure. The fixture 500 (e.g., troffer) includes at least one of a body 510, a lens attachment section 520, a latch 522, a lighting section 530, a lamp 540, a power section 550, and/or a bus 560. The lens attachment section 520 may be coupled to a lens cover of the fixture 500 and/or may be part of the fixture 500 itself. At least one latch 522 may be used to couple a lens cover to the fixture 500. The lighting section 530 includes one or more elements for providing lighting, such as a lamp 540. In the pre-retrofit embodiment of FIG. 5, the lamp 540 may be a traditional fluorescent light bulb or plurality of bulbs. In embodiments where fluorescent bulbs are used, a ballast or other power conversion or adjustment elements may be used.

The lighting section is powered via the power section 550 which is coupled to the lighting section 530 via the bus 560. The power section 550 may receive input power from at least one of an alternating current (AC) and/or direct current (DC) source.

In retrofitting a fixture 500 using a retrofit kit 200, a user may begin by removing at least a portion of a lens cover of the fixture 500 (e.g., using one or more latches 522). The user may remove at least one component of the lighting section 530. In an exemplary embodiment, the user may remove the lamp 540 and either disconnect or remove a ballast of the lighting section 530. In various embodiments, the entirety of the lighting section 530 may be removed from the fixture 500.

Figure 6:
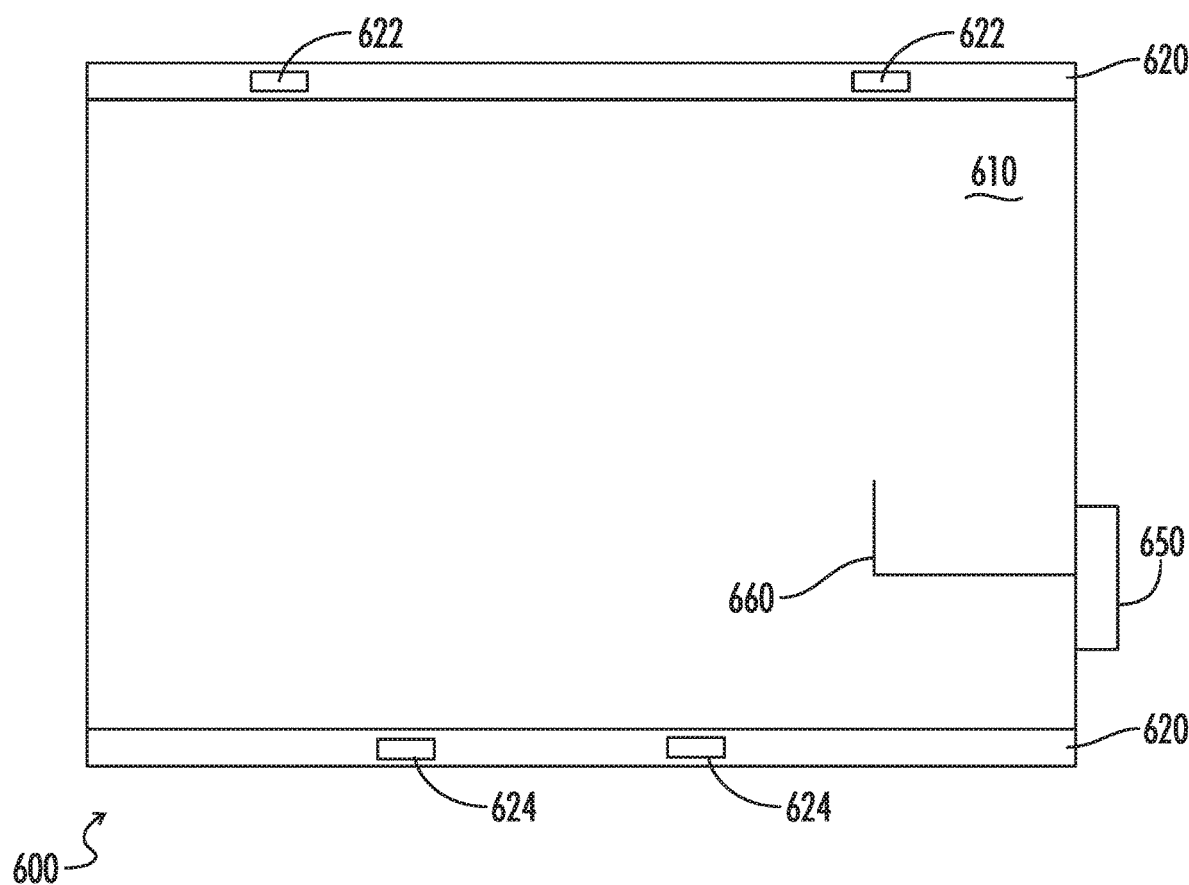
FIG. 6 illustrates an exemplary embodiment of a modified fixture for use with a retrofit kit according to aspects of the present disclosure.

FIG. 6 illustrates an exemplary embodiment of a modified fixture 600 for use with a retrofit kit 200 according to aspects of the present disclosure. The modified fixture 600 reflects an exemplary embodiment of a fixture 500 having its lens cover and lighting section 530 removed. The modified fixture 600 includes at least one of a body 610, an attachment section 620, a hinge opening 622, a latch opening 624, a power section 650, and/or a bus 660. After removing the lens cover of the fixture 500, one or more hinge openings 622 may be accessible.

Figure 7:
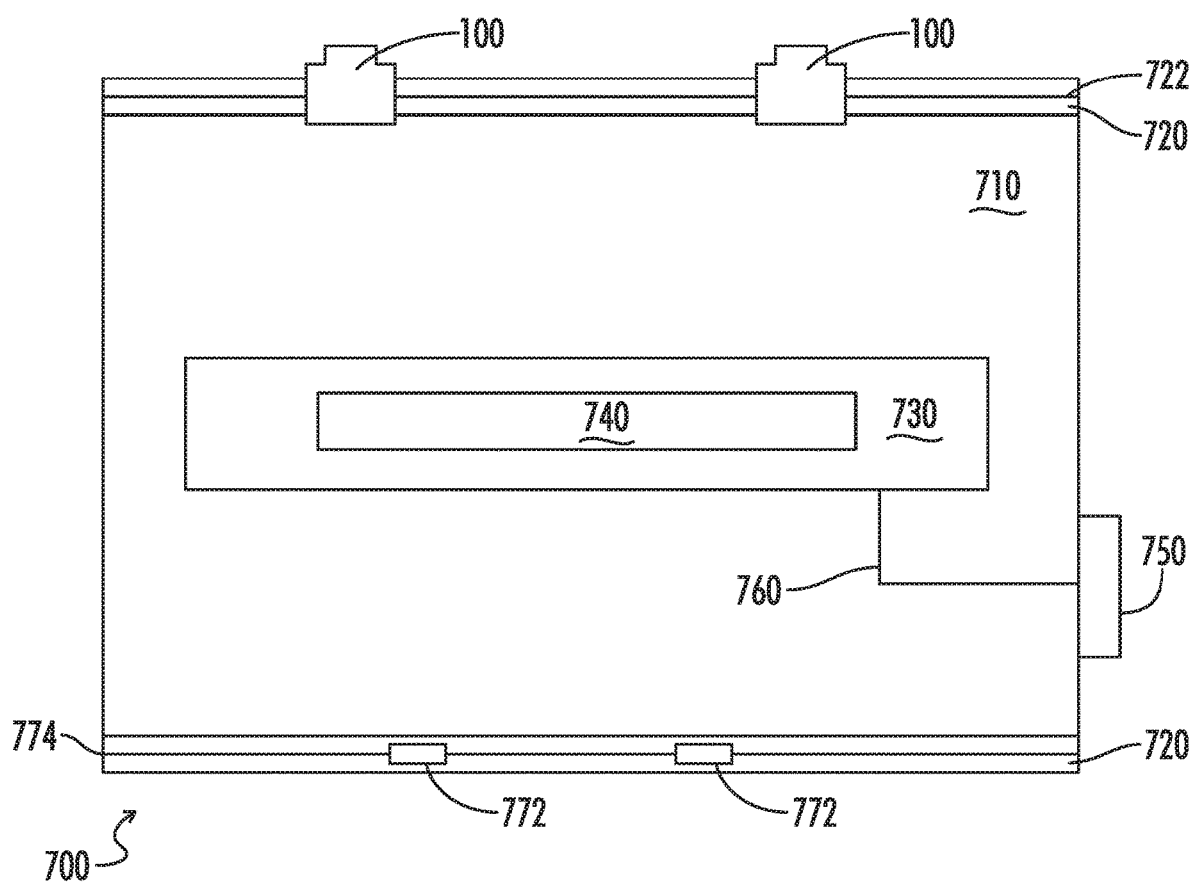
FIG. 7 illustrates an exemplary embodiment of an adapter kit according to aspects of the present disclosure.

FIG. 7 illustrates an exemplary embodiment of an adapter kit 700 according to aspects of the present disclosure. The adapter kit 700 (e.g., retrofit kit) may include one or more of a body 710, a slide 720, a groove 722, a lighting section 730, a lamp 740, an LED driver 750, a bus 760, a slide 770, a latch connector 772, and/or a groove 774. At least a portion of the adapter kit 700 may be configured to couple to a fixture, such as the fixture 500 and/or modified fixture 600 via at least one hinge assembly 100. The hinge assembly 100 may be coupled to the slide 720. The hinge assembly 100 may be configured to lock in place along the slide 720 when a notch 180 of the hinge assembly 100 is placed within the groove 722 of slide 720. Although illustrated as having two hinge assemblies 100, it should be appreciated that the adapter kit 700 may include any number of hinge assemblies 100 coupleable to a fixture or troffer (e.g., at one or more corresponding hinge openings 622). The adapter kit 700 may include one or more latch connectors 772 configured to correspond to one or more latch openings 624 of a fixture or troffer. At least one latch connector 772 may be configured to move along a slide 770 and may optionally include a brake mechanism similar to the hinge assembly 100 to use a notch 180 to lock a latch connector 772 in place when the corresponding notch 180 is received within a groove 774.

The lighting section 730 of the adapter kit 700 may include one or more elements configured to provide lighting, such as a lamp 740. In the case of adapter kit 700, the lamp 740 may be an LED lamp used to retrofit a previously fluorescent lamp-based fixture. The lighting section 730 and/or lamp 740 may receive operating power, in whole or in part, from an LED driver 750 coupled to the lighting section 730 by the bus 760. In various embodiments, the LED driver 750 may be located physically separate from the adapter kit 700 (e.g., mounted or otherwise coupled to a fixture) and may be conductively coupled to the adapter kit 700 via one or more buses, connectors, or wires.

Although illustrated as include each of a hinge assembly 100, a slide 720, a groove 722, a lighting section 730, a lamp 740, an LED driver 750, a bus 760, a slide 770, a latch connector 772, and a groove 744, each element is not required to be present, and in various embodiments one or more elements may be omitted and/or placed or implemented elsewhere. For example, the LED driver 750 and/or one or more elements of the lighting section 730 may be located separately from the adapter kit 700.

In one exemplary embodiment, the adapter kit 700 may include the body 710, at least one hinge assembly 100, and at least one latch connector 772. One or more other elements depicted by FIG. 7 may be coupled to (or connectable with) the adapter kit 700 and/or a fixture at time of installation. Additionally or optionally, one or more elements of the adapter kit 700 may be added to the body 710 according to one or more predetermined or dynamically determined installation parameters. For example, a user may plan to retrofit a fixture having two hinge openings and one latch opening. The user may then couple two hinge assemblies 100 and one latch connector 772 to the body 710 for installation. During installation, one or more other elements of the adapter kit 700 may be coupled to or otherwise connected with the adapter kit 700.

The hinge assembly may include four parts: a hinge, a hinge brake, a slide, and a hinge brake securement device. The hinge 110 is the part of the hinge assembly 100 that is adjusted along the slide 210 on one end (when the hinge brake is in the open position) and where the other end inserts into the hinge slots (e.g., hinge openings) located in the troffer fixture during retrofit installation. The slide 210 may be integral or attached to the retrofit kit and may hold the hinge 110 in place. The slide 210 may contain a groove 220 that capable of inhibiting movement of the hinge 110 when the hinge brake is in the closed position. The hinge brake may secure to the hinge assembly 100 via the hinge brake securement device 160. The hinge brake securement device may be a rivet or other mechanical fastener configured to secure the hinge brake to the hinge 110 and allows the hinge brake to pivot to and from the open and closed positions. When in the closed position the hinge brake may prevent the hinge assembly 100 from moving freely along the slide 210 by the friction between the notch 180 in the bottom of the hinge brake and the surface of the groove 220 in the slide 210. When the hinge brake is in the open position the notch 180 is removed from the groove 220 in the slide 210 and the hinge assembly 100 can move freely along the slide 210.

A slide adjustable hinge and latch securement device for LED troffer retrofit kit panels may be a mechanical device that contains hinge pieces that can be adjusted to line up with the lens cover hinge openings of a fluorescent troffer luminaire. This configuration may allow an LED troffer retrofit kit panel that incorporates a slide adjustable hinge to utilize the troffer hinge openings for installation and securement. The hinges 110 may be adjusted to line up with hinge openings (e.g., hinge openings 622) and may be inserted into these hinge openings of the troffer. This may allow an installer to make the electrical connections hands-free. When the electrical connections are completed the latch securements on the opposite side of the LED troffer retrofit kit panel may be adjusted to line up with the latch openings (e.g., latch openings 624) and may then be latched in place to secure the panel to the troffer.

To facilitate the understanding of the embodiments described herein, a number of terms are defined below. The terms defined herein have meanings as commonly understood by a person of ordinary skill in the areas relevant to the present disclosure. Terms such as "a," "an," and "the" are not intended to refer to only a singular entity, but rather include the general class of which a specific example may be used for illustration. The terminology herein is used to describe specific embodiments of the disclosure, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A hinge apparatus for securing to a slide of a retrofit kit, the slide comprising a portion of the retrofit fit configured to enable a sliding movement of the hinge apparatus there along, and to an opening of a fixture, the apparatus comprising:
    a hinge, the hinge configured to couple to the opening of the fixture;
    a top section connected to the hinge;
    a lower section connected to the top section and having a cavity formed therebetween, the cavity configured to be coupleable to the retrofit kit;
    a hinge brake securement device rotatably coupled to the top section;
    a neck extending outwardly from the hinge brake securement device;
    a hinge brake coupled to the neck; and
    a notch coupled to the hinge brake, the notch configured to be receivable at the slide of the retrofit kit.

2. The hinge apparatus of claim 1, further comprising an extension coupled between the top section and the hinge.

3. The hinge apparatus of claim 1, wherein the hinge brake is configured to restrict movement of the hinge apparatus along the slide of the retrofit kit when the notch is received within the slide of the retrofit kit.

4. The hinge apparatus of claim 1, wherein the hinge apparatus is configured to move along the slide of the retrofit kit when the notch is not received within the slide of the retrofit kit.

5. The hinge apparatus of claim 1, wherein the cavity is configured to receive at least a portion of the retrofit kit therein.

6. A retrofit kit for retrofitting a fixture with a light emitting diode (LED) light source, comprising:
    a body having a slide configured to enable a sliding movement of a hinge apparatus there along, at least a portion of the slide including a groove;
    the hinge apparatus, including,
        a hinge couple able to the fixture;
        a top section connected to the hinge;
        a lower section connected to the top section and having a cavity formed therebetween, the cavity configured to receive at least a portion of the slide;
        a hinge brake securement device rotatably coupled to the top section;
        a neck extending outwardly from the hinge brake securement device;
        a hinge brake coupled to the neck; and
        a notch coupled to the hinge brake, the notch configured to be receivable by the groove, and
    an LED light source coupleable to at least one of the body or the fixture.

7. The retrofit kit of claim 6, wherein the hinge brake is configured to rotate about the hinge brake securement device.

8. The retrofit kit of claim 6, wherein the hinge brake is configured to restrict movement of the hinge apparatus along the groove when the notch is received within the groove.

9. The retrofit kit of claim 6, wherein the hinge apparatus is configured to move along the groove of the retrofit kit when the notch is not within the groove.

10. The retrofit kit of claim 6, wherein the cavity is configured to receive at least a portion of the slide therein.

11. A method of retrofitting a fixture with a light emitting diode (LED) light source using a retrofit kit, comprising:
    removing a lens cover from the fixture;
    adjusting a position of at least one hinge assembly of the retrofit kit to correspond to at least one hinge opening location of the fixture;
    coupling the at least one hinge assembly to the at least one hinge opening location;
    removing an existing light source from the fixture and replacing the existing light source with the LED light source;
    adjusting a position of at least one latch of the retrofit kit to correspond to at least one latch opening location of the fixture; and
    coupling the at least one latch to the at least one latch opening location, wherein coupling the at least one hinge assembly to the at least one hinge opening location includes locking a position of the hinge assembly relative to a slide of the retrofit kit by moving a hinge brake of the hinge assembly into a locking position, and wherein moving the hinge brake into the locking position includes rotating the hinge brake to cause a notch of the hinge brake to be received within a groove of the slide.

12. The method of claim 11, wherein adjusting the position of the at least one hinge assembly to correspond to the at least one hinge opening location includes translating the at least one hinge assembly along a slide portion of the retrofit fit configured to enable a sliding movement of the hinge apparatus there along, while a notch of the hinge assembly is external to a groove of the slide portion.

13. The method of claim 11, wherein prior to adjusting the position of the at least one hinge assembly, the method includes moving a hinge brake of the hinge assembly into an unlocked position.

14. The method of claim 13, wherein the moving the hinge brake into the unlocked position includes rotating the hinge brake to cause a notch of the hinge assembly to exit a groove of the retrofit kit.

15. The method of claim 11, wherein the at least one hinge assembly comprises a plurality of hinge assemblies, and wherein adjusting the position of at least one hinge assembly to correspond to the at least one hinge opening location of the fixture includes adjusting at least one of the plurality of hinge assemblies.

16. A method of retrofitting a fixture with a light emitting diode (LED) light source using a retrofit kit, comprising:
removing a lens cover from the fixture;
adjusting a position of at least one hinge assembly of the retrofit kit to correspond to at least one hinge opening location of the fixture;
coupling the at least one hinge assembly to the at least one hinge opening location;
removing an existing light source from the fixture and replacing the existing light source with the LED light source;
adjusting a position of at least one latch of the retrofit kit to correspond to at least one latch opening location of the fixture; and
coupling the at least one latch to the at least one latch opening location,
wherein prior to adjusting the position of the at least one hinge assembly, a hinge brake of the hinge assembly is moved into an unlocked position, and
wherein moving the hinge brake into the unlocked position includes rotating the hinge brake to cause a notch of the hinge assembly to exit a groove of the retrofit kit.

17. The method of claim 16, wherein adjusting the position of the at least one hinge assembly to correspond to the at least one hinge opening location includes translating the at least one hinge assembly along a slide portion of the retrofit kit while a notch of the hinge assembly is external to a groove of the slide.

18. The method of claim 16, wherein the at least one hinge assembly comprises a plurality of hinge assemblies, and wherein adjusting the position of at least one hinge assembly to correspond to the at least one hinge opening location of the fixture includes adjusting at least one of the plurality of hinge assemblies.

* * * * *